A. T. CRANE.
TOOL FOR FINISHING SCREW THREADS.
APPLICATION FILED MAR. 15, 1909.
935,247.
Patented Sept. 28, 1909.
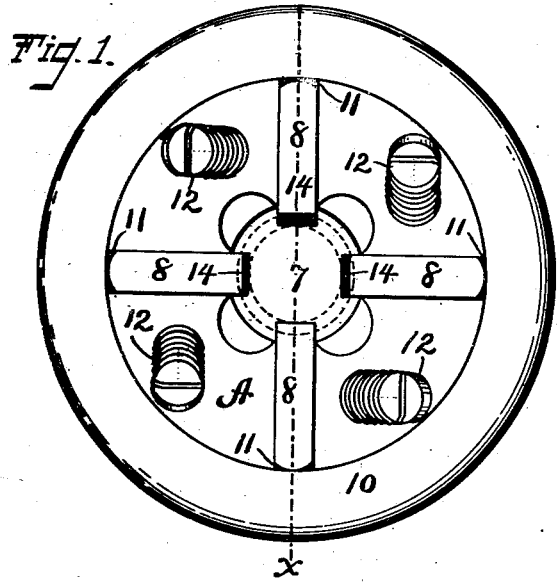
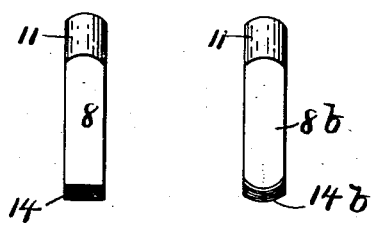
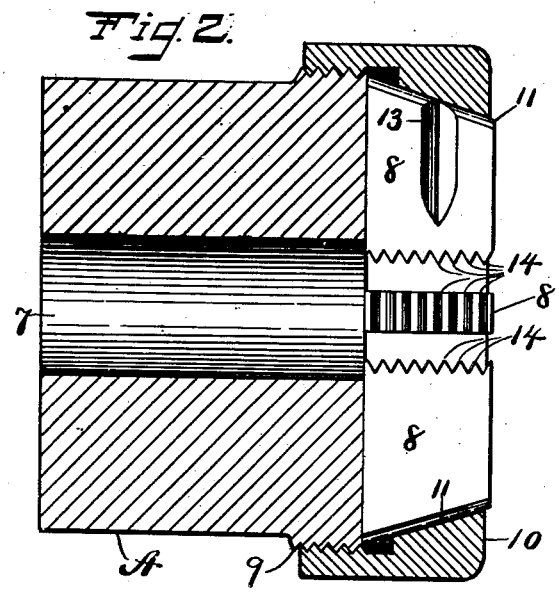
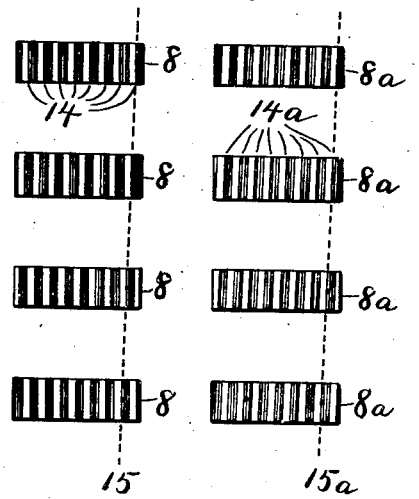
Witnesses.
S. H. Clarke
N. L. Lockwood
Inventor.
Arthur T. Crane.
By James Shepard
Atty.

UNITED STATES PATENT OFFICE.

ARTHUR T. CRANE, OF NEW BRITAIN, CONNECTICUT.

TOOL FOR FINISHING SCREW-THREADS.

935,247.  Specification of Letters Patent.  Patented Sept. 28, 1909.

Application filed March 15, 1909. Serial No. 483,490.

*To all whom it may concern:*

Be it known that I, ARTHUR T. CRANE, a citizen of the United States, residing at New Britain, in the county of Hartford and State of Connecticut, have invented certain new and useful Improvements in Tools for Finishing Screw-Threads, of which the following is a specification.

My invention relates to improvements in tools for finishing screw threads after they have been formed or cut in any ordinary manner, as for example by means of cutting dies, and the object of my improvement is to provide tools specially adapted for said work and which may be used in an ordinary tool holder for bearing on two or more sides of a screw with a rubbing pressure.

In the accompanying drawing:—Figure 1 is a front elevation of the end of a tool holder with four of my tools held therein. Fig. 2 is a sectional view of the said holder on the line $x$ of Fig. 1, the tools therein being shown in elevation. Fig. 3 is a front view of one of the said tools. Fig. 4 is a like view of the same in a modified form as to its working edge. Fig. 5 is a developed view of the working edges or faces of the four tools constructed in accordance with Figs. 1, 2 and 3, and Fig. 6 is a like view of the same in a modified form.

A designates the body of an ordinary tool holder such as is commonly used for holding dies for cutting screw threads. It is provided with a central bore 7 while its front end is twice slotted transversely to the said bore in order to form slots for four plate like tools 8. It is also provided with external screw threads 9 near the said slotted end to receive the screw sleeve or cone 10 that bears on the tapering outer edges 11 of the tools 8. It is also provided with set screws 12 that bear upon shoulders 13 formed in one side of the tools 8, to assist in holding the said tools in place. This tool holder is not of my invention but is an ordinary form of tool holder now in common use for holding plate like dies for cutting screw threads and any other known form of holder to which my tools are adapted may be substituted therefor, without departing from my invention.

My tools 8 are of the general plate like form of the cutting dies heretofore employed for cutting screw threads, but differ therefrom by the shape and character of the working edges or faces. The shape of the outer edges, the thickness of each tool or plate, and the shape of the broad sides are determined by the construction of the holder in which the tools are to be used, the essential thing as to their general shape being that the shape must be such that they may be in place with two or more of the working edges bearing upon two or more sides of a screw with a rubbing action that does not yield to the outward pressure of the screw on the said working edges. From this it will be seen that the new and important feature of my tools resides mainly in the working edges. These edges are serrated by forming as many transverse V shaped ridges 14 as there are threads to the inch in the screw to be finished, the depth of the grooves between the said ridges corresponding to the desired depth of the grooves in the thread, whereby the angle of the ridges at their sides will correspond with the angle of the thread of the screw to be produced. Unlike the serrated edges of screw cutting dies or tools, the working edges of my tools have their most prominent or inwardly projecting point along the median line of each tool, while the ends of the ridges 14 at the two broad sides of the plate like tools, or at least on that broad side which is foremost relatively to the work passing therethrough, are clearance spaces, or the non-working part of the tools. The ends of the ridges, although on the working edge of the tools are remote from the median line which does the work. In other words it is the middle part of each ridge and not the ends of the ridge that is brought into action in use. In dies for cutting screw threads, it is the ends of the ridges that do the work and all the rest of the ridges to the opposite side of the die are generally cut down to form the proper clearance. In Figs. 1, 2 and 3, the ridges of my tools extend at a right angle to the broad sides of the tools and also squarely across the edges at a right angle to the length of each tool. The two broken circles in Fig. 1, indicate respectively the tops and bottoms of the ridges in the screw being finished therein. The extreme ends or inner edges of the tools represent the parts which act upon the bottom of the threads in the screw being operated upon and by comparing these with the inner broken circle representing the bottom of the said thread it will be readily seen how both ends of all the ridges of each tool is out of action while all of the ridges are in action at their middle portion along the median line of the tool. These tools act upon all other parts of the thread in the same way.

The tools are designed to be used only in finishing screw threads. The threads are first cut or otherwise formed about as nearly perfect as it is practicable to form them and of a diameter slightly in excess of the predetermined size of the finished screw. The screw or blank thus formed is run through between the tools in the holder when the holder is rotated in any proper manner and the screw held against rotation, or vice versa, thereby subjecting the surface or skin of the screw to a rubbing pressure which acts to smooth and compact the said surface and reduces the diameter of the screw to the predetermined size and with great precision.

The tools are adjusted and held in the holder in the ordinary manner of adjusting and holding screw threading dies therein.

In order to make the ridges of the several tools fit a screw thread, care should be taken to so arrange or construct the tools that the ridges have their proper position relatively to the pitch of the screw and their position in the holder. For example, when there are four tools as shown, the ridges of each tool should be offset or advanced longitudinally of the axis of the holder by a distance equal to one quarter of the distance between the tops of two adjacent ridges. These are shown thus arranged in Figs. 2 and 5. In Fig. 5 the broken line 15 indicates the lead or pitch of the screw to be finished and extends through the tops of the ridges that will successively act upon the groove in the thread. In Fig. 6 there are four similar tools with ridges formed in like order as indicated by the broken line 15$^a$ only as these ridges 14$^a$ extend across the tools 8$^a$ at an incline or angle corresponding to the said broken line 15$^a$, instead of squarely across the said tools as shown in Figs. 1 to 5. The operation is substantially the same, but the square across form shown in Figs. 1 to 5 is more conveniently formed. Either form may be made by a suitable milling tool or cutter moving across the edges of the tool blanks when they are properly held in place. In Fig. 4, I have shown the working face of the tools 8$^b$ as convex in end view instead of square across making the tops of the ridges 14$^b$ extend in a curved instead of a straight line. In all of the forms shown the work is done by the middle portion of the ridges and not their ends. The convex form shown in Fig. 4 would be preferable were it not for the fact that it is more expensive to make.

By my improvement I provide simple, inexpensive and efficient means for finishing screw threads by a rubbing pressure, whereby the surface of the thread is made smooth and solid, and the screw is brought to a predetermined size with precision.

I claim as my invention:—

1. A tool for finishing screw threads comprising a plate like body having a transversely ribbed edge, the tops of the ribs and bottoms of the grooves between the ribs extending across the said ribbed edge in right lines.

2. A tool for finishing screw threads comprising a transversely ribbed edge, the tops of the ribs and bottoms of the grooves between the ribs extending across the said ribbed edge in right lines and at a right angle to the length of the said ribbed edge.

3. A tool for finishing screw threads comprising a plate like body, having a working edge in the form of V shaped ribs extending across the said edge, the working or bearing part of the tool extending along the said working edge through a middle portion of the ribs away from the ends of the said ribs.

4. The combination of a suitable tool holder with a plurality of thread finishing tools mounted therein, the said tools having transversely arranged ribs on their inner edge and mounted in the said holder with the middle portion of the said ribs away from the ends thereof forming the working or bearing part of the tool.

ARTHUR T. CRANE.

Witnesses:
SHEFFIELD H. CLARKE,
NEWTON L. LOCKWOOD.